(12) United States Patent
Pianka et al.

(10) Patent No.: US 11,171,735 B2
(45) Date of Patent: Nov. 9, 2021

(54) ESTIMATING NOISE POWER ON A FREQUENCY CHANNEL BASED ON AT LEAST ONE UNUSED ORTHOGONAL SPREADING CODE

(71) Applicant: CommScope Technologies LLC, Hickory, NC (US)

(72) Inventors: Boaz Pianka, Lexington, MA (US); Stuart D. Sandberg, Acton, MA (US)

(73) Assignee: CommScope Technologies LLC, Hickory, NC (US)

( * ) Notice: Subject to any disclaimer, the term of this patent is extended or adjusted under 35 U.S.C. 154(b) by 65 days.

(21) Appl. No.: 16/717,954

(22) Filed: Dec. 17, 2019

(65) Prior Publication Data

US 2020/0235838 A1 Jul. 23, 2020

Related U.S. Application Data

(60) Provisional application No. 62/886,507, filed on Aug. 14, 2019, provisional application No. 62/795,322, filed on Jan. 22, 2019.

(51) Int. Cl.
| | |
|---|---|
| *H04B 7/216* | (2006.01) |
| *H04J 13/18* | (2011.01) |
| *H04B 1/7103* | (2011.01) |
| *H04W 72/04* | (2009.01) |
| *H04W 72/08* | (2009.01) |
| *H04J 13/16* | (2011.01) |

(52) U.S. Cl.
CPC ............ *H04J 13/18* (2013.01); *H04B 1/7103* (2013.01); *H04W 72/044* (2013.01); *H04W 72/085* (2013.01); *H04J 2013/165* (2013.01)

(58) Field of Classification Search
None
See application file for complete search history.

(56) References Cited

U.S. PATENT DOCUMENTS

| | | | |
|---|---|---|---|
| 2003/0133493 A1* | 7/2003 | Suzuki | H04B 1/7113 375/130 |
| 2010/0111141 A1 | 5/2010 | Currivan et al. | |

(Continued)

FOREIGN PATENT DOCUMENTS

WO 2014189437 A1 11/2014

OTHER PUBLICATIONS

Faragalla, "Improving Digital Signaling on Time Varying Channels using RAKE Receiver", A thesis submitted in partial fulfillment of the requirements for the degree of Master of Science in Electrical Engineering Technology, Sep. 2013, pp. 1 through 119, Benha University Faculty of Engineering, uploaded by Abdelhalim Zekry Sep. 15, 2015.

(Continued)

*Primary Examiner* — Phuongchau Ba Nguyen
(74) *Attorney, Agent, or Firm* — Fogg & Powers LLC

(57) ABSTRACT

A receiving device in a communication system is provided. The communication system includes at least one processor configured to estimate noise power on a frequency channel by despreading a reception on the frequency channel using at least one non-assigned despreading code. The at least one non-assigned despreading code corresponds to at least one spreading code that is unused by transmitting devices in the communication system on the frequency channel.

16 Claims, 5 Drawing Sheets

400

DETERMINE AT LEAST ONE UNUSED ORTHOGONAL SPREADING CODE FOR A FREQUENCY CHANNEL IN A WIRELESS COMMUNICATION SYSTEM
402

ESTIMATE NOISE IN THE FREQUENCY CHANNEL BY DESPREADING A RECEPTION ON THE FREQUENCY CHANNEL USING AT LEAST ONE DESPREADING CODE CORRESPONDING TO THE AT LEAST ONE UNUSED SPREADING CODE
404

(56) References Cited

U.S. PATENT DOCUMENTS

2013/0176841 A1\* 7/2013 Cao ................... H04L 1/1671
　　　　　　　　　　　　　　　　　　　370/210
2014/0341260 A1\* 11/2014 Reial ................ H04B 1/70735
　　　　　　　　　　　　　　　　　　　375/148

OTHER PUBLICATIONS

International Searching Authority, "International Search Report and Written Opinion from PCT Application No. PCT/US2019/066971", from Foreign Counterpart to U.S. Appl. No. 16/717,954, dated Apr. 14, 2020, pp. 1 through 10, Published: WO.
Monieb et al., "Noise Estimation for Multiuser Multi-carrier PUCCH in LTE-A", 2017, Japan-Africa Conference on Electronics, Communications and Computers (JAC-ECC), Dec. 2017, pp. 91 through 95, IEEE.

\* cited by examiner

ESTIMATING NOISE POWER ON A FREQUENCY CHANNEL BASED ON AT LEAST ONE UNUSED ORTHOGONAL SPREADING CODE

CROSS-REFERENCE TO RELATED APPLICATIONS

This application claims priority to: U.S. Provisional Patent Application No. 62/795,322 entitled "ESTIMATING NOISE POWER ON A FREQUENCY CHANNEL BASED ON AT LEAST ONE UNUSED ORTHOGONAL SPREADING CODE" filed on Jan. 22, 2019; and U.S. Provisional Patent Application No. 62/886,507 entitled "ESTIMATING NOISE POWER ON A FREQUENCY CHANNEL BASED ON AT LEAST ONE UNUSED ORTHOGONAL SPREADING CODE" filed on Aug. 14, 2019, both of which are incorporated herein by reference in their entireties.

BACKGROUND

In multiple access communication systems, digital receivers often need a good estimate of the signal to noise and interference ratio (SINR), which in turn requires it to estimate the power of noise and interference in the received signal. Accordingly, the present systems and methods may describe noise estimation by despreading a frequency channel based on unused orthogonal spreading codes.

SUMMARY

A receiving device in a communication system is provided. The communication system includes at least one processor configured to estimate noise power on a frequency channel by despreading a reception on the frequency channel, using at least one non-assigned despreading code. The at least one non-assigned despreading code corresponds to at least one spreading code that is unused by transmitting devices in the communication system on the frequency channel.

DRAWINGS

Understanding that the drawings depict only exemplary configurations and are not therefore to be considered limiting in scope, the exemplary configurations will be described with additional specificity and detail through the use of the accompanying drawings, in which.

Figure 1:
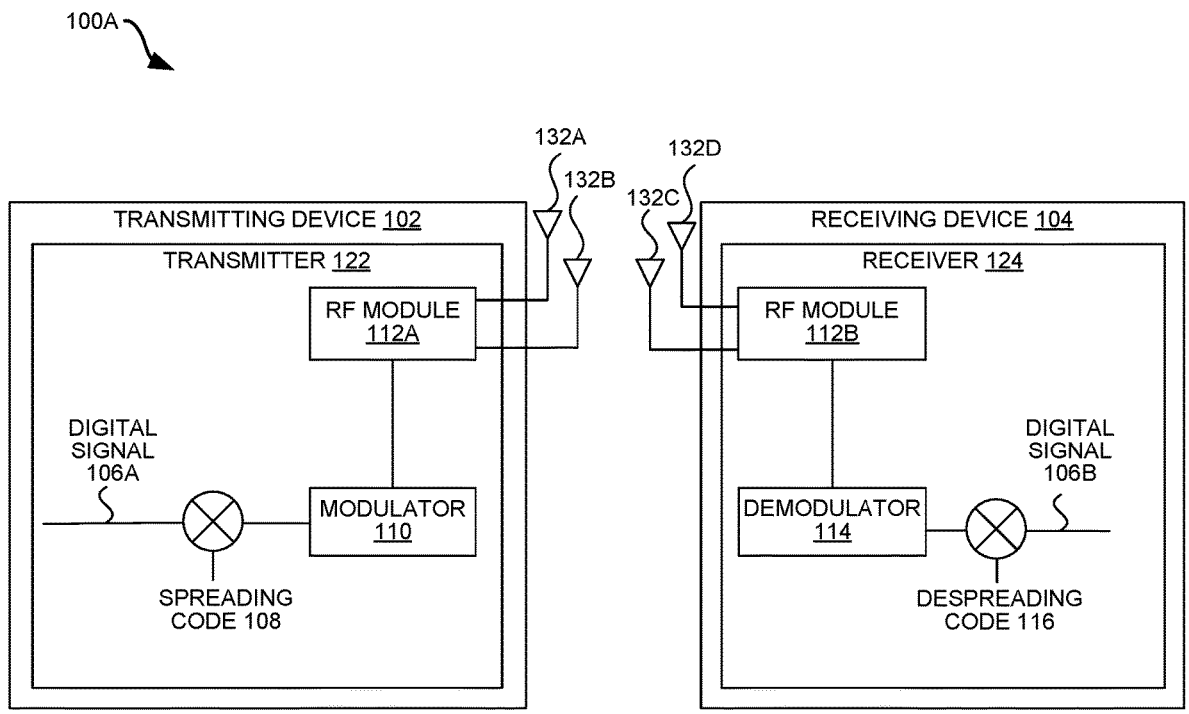
FIG. 1 is a block diagram illustrating an example communication system for estimating noise power on a frequency channel based on at least one unused orthogonal spreading code.

In accordance with common practice, the various described features are not drawn to scale but are drawn to emphasize specific features relevant to the exemplary configurations.

DETAILED DESCRIPTION

A signal to noise and interference ratio (SINR) estimate may be used in several aspects of a digital receiver, including: deciding whether a signal has been transmitted to prevent false alarms or erasures; closed loop power control that maintains SINR close to a target; and/or optimal combining of several re-transmissions or receive branches in a multi-antenna system.

A common technique for allowing multiple users to share wireless communication bandwidth is to spread each user's information bits using a different orthogonal code sequence, also referred to as a "spreading code", "code sequence", "code", or "sequence". A coherent receiver may use the known users' code sequences to reconstruct each user's bits with little interference from other users—a process called de-spreading. At the same time, the noise at the receiver input is also de-spread corresponding to each user.

For simplicity, the term "noise" is used to refer to both noise and interference. Reliable estimation of noise (which is random) requires as many observations as possible to reduce the estimation error. Conventional techniques used for estimating the noise level have several drawbacks.

In a first technique, a receiver may calculate the residual channel estimation error of known reference or pilot symbols transmitted by each user. However, pilot signals are used sparingly in practical systems since they represent overhead. Accordingly, techniques relying on pilot signals often results in very large noise estimation errors.

In a second technique, a receiver may use a distance metric for each data symbol between the expected constellation point and received signal after de-spreading, which is proportional to the noise amplitude. However, this technique is complex to implement because it requires re-modulation of the received information after decoding to establish the expected constellation points, e.g., even though the normalized constellation points may be known, it is still necessary to convolve with the channel estimate to find the expected point to compare with the observation. Furthermore, after despreading there are fewer symbols or observation points. Therefore, in control channels which communicate few bits at a time, the estimation errors are still significant.

In a third technique, a receiver may calculate a difference signal between the received signal and a signal reconstructed from decoded data, of all active users/transmitting devices 102, that is re-modulated and re-spread. This technique typically yields lower estimation errors due to the large number of input observations. This technique is also complex to implement as the whole transmit process must be reproduced in the receiver. Furthermore, this technique assumes a perfect knowledge of the active users. If an unexpected user transmits, it is considered to be noise and causes an inaccurate noise estimate.

In contrast, the present systems and methods may utilize unused spreading code(s) (to estimate noise), which do not rely on pilot/reference symbols or data symbols. Compared to conventional techniques, the present systems and methods (1) have low complexity to implement with low estimation error; and (2) are not sensitive to unexpected user transmissions, since no user is going to use these unused spreading code(s), e.g., due to LTE standard compliance.

Example Receiver and Transmitter

FIG. 1 is a block diagram illustrating an example communication system 100A for estimating noise power on a frequency channel based on at least one unused orthogonal spreading code. The communication system 100A may include at least one transmitting device 102 and at least one receiving device 104 communicating wirelessly in a geographic area.

Each of the transmitting device 102 and the receiving device 104 may be implemented in software and/or firmware (e.g., instructions stored on a memory) executing on one or more suitable programmable processors. Each of the transmitting device 102 and the receiving device 104 (or portions thereof) can be implemented in other ways (for example, in a field programmable gate array (FPGA), application specific integrated circuit (ASIC), etc.).

The transmitting device 102 may be housed in a separate physical housing than the receiving device 104 that it communicates with. Optionally, the transmitting device 102 may include both a transmitter 122 and a receiver 124 as described herein. The receiving device 104 may be a wireless communication device and may be part of a user equipment (UE), eNodeB, base station, or any other computing device that receives signals wirelessly. Optionally, the receiving device 104 may include both a transmitter 122 and a receiver 124 as described herein.

Each of the transmitting device 102 and receiving device 104 may be a wireless communication device and may be part of a user equipment (UE), eNodeB, base station, or any other computing device that transmits signals wirelessly. Optionally, the transmitting device 102 and/or the receiving device 104 may be implemented as part of a centralized radio access network (C-RAN) architecture. A C-RAN is a point-to-multipoint distributed base station with one or more baseband controllers that are physically separated from, and communicatively coupled to, multiple radio points (RPs). An example C-RAN is described below.

In one configuration, the system 100A may be part of a Long Term Evolution (LTE) radio access network providing wireless service using an LTE air interface. LTE is a standard developed by the Third Generation Partnership Project (3GPP) standards organization. In an LTE configuration, an LTE Evolved Node B (also referred to here as an "eNodeB" or "eNB") may communicate with at least one UE. The eNodeB may provide UEs with access to the wireless network operator's core network (not shown) to enable the wireless devices to wirelessly communicate data and voice (using, for example, Voice over LTE (VoLTE) technology).

The transmitting device 102 and the receiving device 104 may use sequence spreading to communicate with each other. For example, the transmitting device 102 may apply a spreading code 108 to a digital signal 106A to spread a digital signal 106A across a larger bandwidth using a different orthogonal code sequence (so it can be multiplexed onto a frequency channel with other signals). A modulator 110 may be used to convert the spread digital signal into an analog signal (symbols), then pass the signal to an RF module 112A. The RF module 112A may include circuitry configured to amplify (e.g., using a power amplifier) the output of the modulator 110 before transmitting an RF signal on at least one antenna 132A-B.

The receiving device 104 may receive an RF signal (with multiple transmitting device 102 signals multiplexed onto it) on at least one antenna 132C-D. An RF module 112B may include circuitry configured to filter and/or amplify the RF signal received from the transmitting device 102, e.g., using a band-pass filter and/or low-noise amplifier. A demodulator may convert the analog signal into a demodulated signal. The receiving device 104 may then reconstruct the transmitting device's digital signal 106B by applying a despreading code 116 to the demodulated signal. For example, the despreading code 116 applied by the receiving device 104 may be the complex-conjugate of the spreading code 108 applied by the transmitting device 102.

In some configurations, despreading includes 2 steps: (1) multiplying a set of symbols by a sequence; and (2) combining the products. The assumption is that the set of symbols include a repeat of the same information. When the correct sequence is used, symbols constructively combine yielding the original information. When any other sequence is used, symbols combine destructively yielding zero (or noise). The application of spreading codes and despreading codes allows multiple users to be multiplexed onto the same time and frequency resources in a frequency channel.

Any specific modulation scheme(s) may be used by the transmitting device 102 and/or the receiving device 104, including binary phase-shift keying (BPSK), quadrature phase-shift keying (QPSK), 16-phase quadrature amplitude modulation (16QAM), 64-state quadrature amplitude modulation (64QAM), other phase-shift keying (PSK), other quadrature amplitude modulation (QAM), frequency-shift keying (FSK), and/or amplitude-shift keying (ASK) modulation.

Furthermore, although not shown in FIG. 1, the transmitter 122 and receiver 124 may perform additional processing relating to cyclic redundancy code (CRC) generation/removal, encoding/decoding, Inverse Fast Fourier Transform (IFFT)/Fast Fourier Transform (FFT), etc.

The system 100A may utilize a set of orthogonal spreading codes, e.g., for a particular frequency channel. To improve the accuracy of noise power estimation, the system 100A may utilize a subspace of the space spanned by the orthogonal codes solely for noise power estimation. This can be afforded by either utilizing spreading codes that are excluded from use in the system 100A due to design constraints (which offers improvement without additional overhead), or by utilizing spreading codes reserved for this purpose and not provided to any user (which may increase overhead). Therefore, the receiving device 104 may estimate noise power in wireless receptions (on a frequency channel) using a subset of the orthogonal spreading codes for the frequency channel that are not otherwise being used by transmitting devices 102 and receiving devices 104 in the same geographical area.

The present systems and methods utilize these hidden dimensions/unused spreading codes by despreading them as if they were normal users. In other words, the receiving device 104 may estimate noise power by despreading received power on a frequency channel based on an unused spreading code. This yields a projection of only the input noise component onto the unused dimensions/codes, which may be used to directly calculate the noise power and compensate for the spreading factor.

As long as there is at least one code sequence not being used by the receiving device 104 and surrounding transmitting devices 102, it can be used to estimate noise power. For example, there may be an agreement by a receiving device 104 and surrounding transmitting devices 102 (e.g., according to a standard, such as LTE) that certain code sequences are not used on a frequency channel. Additionally or alternatively, the unused code sequence(s) may be specifically reserved/allocated for noise power estimation, e.g., by the scheduling entity.

In other words, assume that N different spreading codes are possible on a frequency channel and only a subset of those (N-K) are actually made available to use (on the frequency channel) by the transmitting devices 102 in the system 100A. That leaves K unused spreading codes. Assuming the spreading codes are orthogonal to each other, a noise power estimate/measurement in one of those K unused spreading codes includes none of the signal energy that was sent in the other (N-K) ones used by the transmitting devices 102, but it does include a noise observation. So, the receiving device 104 can make a noise observation on one or more of the K unused spreading codes (e.g., up to K noise observations) without being interfered with by possible signals using the other set-aside (N-K) spreading codes.

Non-orthogonality of the spreading codes may introduce leakage of power from other users into the K unused spreading codes, which can be considered noise because it would be affecting other active users as well. Furthermore, no distinction is made in this example between thermal noise and interference. Rather the noise power estimate represents the contribution of noise to each of the active users/transmitting devices 102.

In a specific example, the physical uplink control channel (PUCCH) is an uplink control channel in LTE. The orthogonal code space for PUCCH is constructed by a combination of 12 Zadoff-Chu and four Walsh codes spanning a signal space of 12×4=48 orthogonal dimensions/codes. In other words, 48 different users can be multiplexed to transmit on a single PUCCH. Due to specific constraints, the LTE standard only utilizes 12×3=36 dimensions/codes leaving 12 dimensions/codes that are assured (by the LTE specification) not to be transmitted on by any user.

PUCCH uses a minimal number of frequency-time resources, which makes the noise power estimation difficult. However, the present systems and methods despreads these 12 unused spreading codes as if they were normal users in order to calculate the noise power and compensate for the spreading factor. Therefore, in a no-noise environment, the result of despreading is 0, while in a noisy environment, the result of despreading is all noise (since there are no desired signals spread with the unused spreading codes).

It should be noted, however, that the present systems and methods may be used with any frequency channel (LTE or otherwise) with at least one unused spreading code, not just PUCCH.

Example 4G C-RAN

Figure 2:
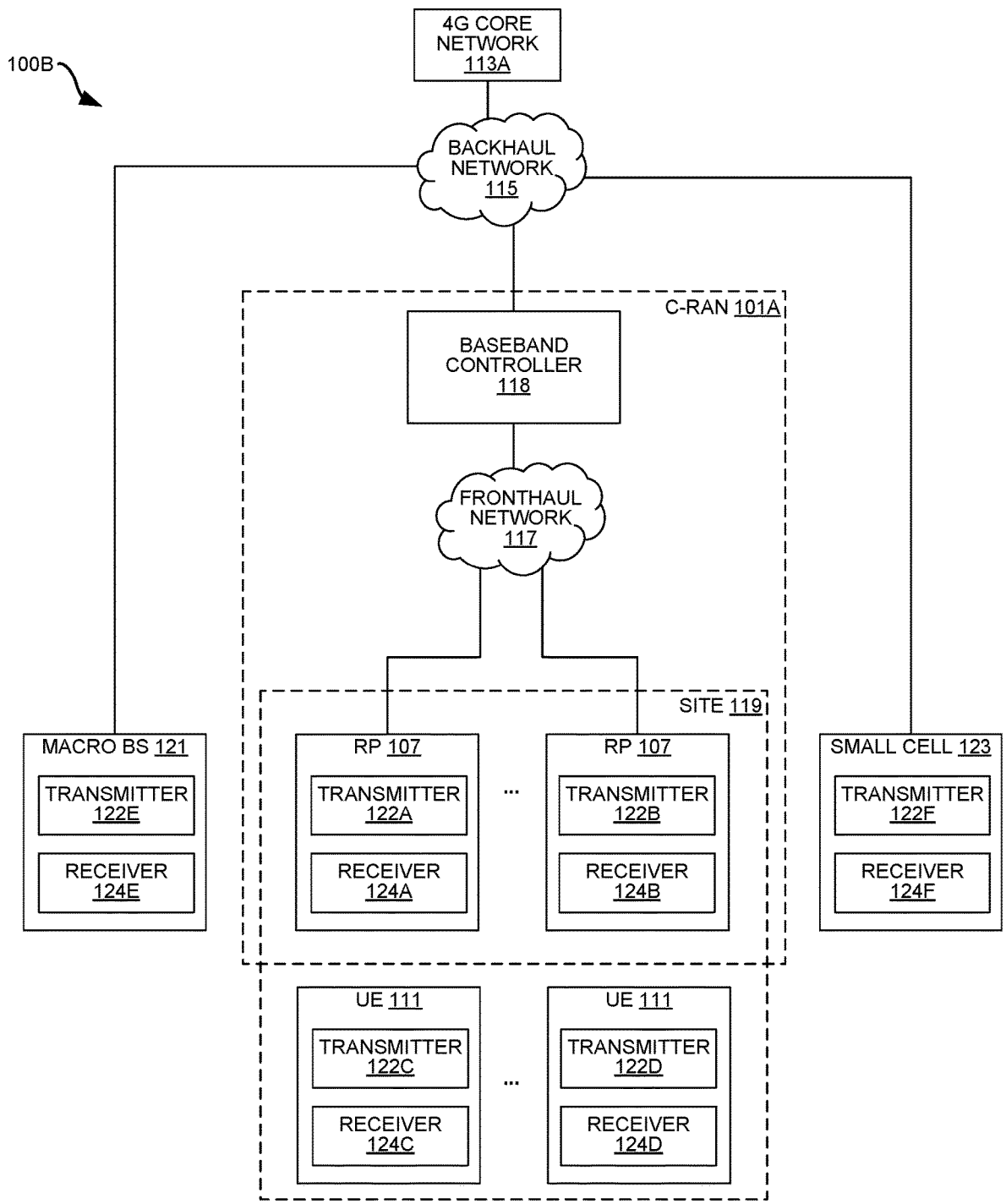
FIG. 2 is a block diagram illustrating another example communication system for estimating noise power on a frequency channel based on at least one unused orthogonal spreading code.

FIG. 2 is a block diagram illustrating another example communication system 100B for estimating noise power on a frequency channel based on at least one unused orthogonal spreading code. The communication system 100B includes a cloud radio access network (C-RAN) 101A that provides wireless service/coverage and capacity for one or more wireless network operators.

The C-RAN 101A utilizes a point-to-multipoint distributed base station architecture that employs at least one (and optionally multiple) baseband unit 118 and multiple radio points (RPs) 107 that serve at least one cell. The baseband unit 118 is also referred to herein as a "baseband controller", "controller", "BC", or "CU".

It should be noted that the baseband controller 118 may or may not be located at the site 119 (with the RPs 107). For example, the baseband controller 118 may be physically located remotely from the RPs 107 (and the site 119) in a centralized bank of baseband controllers 118. Additionally, the RPs 107 are preferably physically separated from each other within the site 119, although they are each communicatively coupled to the baseband controller 118.

The RPs 107 and UEs 111 connected to (e.g., provided wireless service by) the C-RAN 101A may be located at a site 119. The site 119 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area). For example, the site 119 may be at least partially indoors, but other alternatives are possible.

The C-RAN 101A may be coupled to a 4G core network 113A of each wireless network operator over an appropriate backhaul network 115. For example, the Internet (or other ETHERNET network) may be used for backhaul between the C-RAN 101A and each core network 113A. However, it is to be understood that the backhaul network 115 can be implemented in other ways. The backhaul network 115 may be implemented with one or more switches, routers, and/or other networking devices.

In some configurations, the C-RAN 101A may be implemented as a Long Term Evolution (LTE) radio access network providing wireless service using an LTE air interface. LTE is a standard developed by 3GPP standards organization. In some configurations, the C-RAN 101A may implement the functionality of an LTE eNodeB. An eNodeB is used to provide UEs 111 with mobile access to the wireless network operator's core network 113A to enable UEs 111 to wirelessly communicate data and voice (using, for example, Voice over LTE (VoLTE) technology).

Also, in an exemplary LTE configuration, each core network 113A may be implemented as an Evolved Packet Core (EPC) 113A comprising standard LTE EPC network elements such as, for example, a mobility management entity (MME) and a Serving Gateway (SGW) and, optionally, a Home eNodeB gateway (HeNodeB GW) (not shown) and a Security Gateway (SeGW) (not shown).

The baseband controller 118 and RPs 107 can be implemented so as to use an air interface that supports one or more of frequency-division duplexing (FDD) and/or time-division duplexing (TDD). Also, the baseband controller 118 and the radio points 107 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the baseband controller 118 and the radio points 107 can implement one or more of the LTE transmission modes. Moreover, the baseband controller 118 and the radio points 107 can be configured to support multiple air interfaces and/or to support multiple wireless operators.

Additionally or alternatively to LTE, the present systems and methods may be used with a base station using any air interface, e.g., 3G, 4G, 5G, IEEE 802.11 (Wi-Fi), IEEE 802.16 (Wi-Max), etc. Furthermore, the present systems and methods can be utilized with any release of the LTE standard, including Frequency-Division Duplex (FDD) and Time-Division Duplex (TDD) variants.

In some configurations, the fronthaul network 117 that communicatively couples each baseband controller 118 to the one or more RPs 107 is implemented using a standard ETHERNET network. However, it is to be understood that the fronthaul between the baseband controller 118 and RPs 107 can be implemented in other ways. The fronthaul network 117 may be implemented with one or more switches, routers, and/or other networking devices.

Data can be fronthauled between the baseband controller 118 and RPs 107 in any suitable way (for example, using fronthaul interfaces and techniques specified in the Common Public Radio Interface (CPRI) and/or Open Base Station Architecture Initiative (OBSAI) family of specifications).

Although not shown, a management system may be communicatively coupled to the baseband controller 118 and RPs 107, for example, via the backhaul network 115 and the fronthaul network 117 (in the case of the RPs 107). The management system may send and receive management communications to and from the baseband controller 118, which in turn forwards relevant management communications to and from the RPs 107.

Each RP 107 may include or be coupled to at least one (e.g., two) antennas via which downlink RF signals are radiated to UEs 111. In some configurations, one or more RPs 107 may utilize a transmitter 122A-B according to the present systems and methods to transmit downlink signals to nearby UEs 111 at the site 119.

Each RP 107 may also use the at least one (e.g., two) antennas to receive uplink RF signals transmitted by UEs 111. In some configurations, one or more RPs 107 may utilize a receiver 124A-B according to the present systems and methods to receive uplink signals from nearby UEs 111 at the site 119. Specifically, utilizing the receiver 124 described herein may enable an RP 107 to estimate noise power on a frequency channel (on which it receives uplink signals from UEs 111) based on at least one unused orthogonal spreading code.

Additionally, one or more macro base stations 121 may also implement a transmitter 122E and/or a receiver 124E according to the present systems and methods. A macro base station is a stationary, non-distributed base station (that is not part of a C-RAN 101A), which provides wireless service to UEs 111 using high power signals. A macro cell will typically perform all L1-L3 functions.

Furthermore, one or more small cells 123 may also implement a transmitter 122E and/or a receiver 124E according to the present systems and methods. The term "small cell" is used herein to refer to a low-power radio access node (not part of a C-RAN 101A), which provides wireless service to UEs 111. Small cells are generally lower-power, shorter-range, and can serve fewer max concurrent users than macro base stations 121. For example, small cell(s) may be used to fill in coverage gaps in macro base station 121 coverage, e.g., indoors, in urban environments, etc. Small cells may also be referred to as femto cells, femto base stations, pico cells, pico base stations, access points, etc.

Any of the RPs 107, UEs 111, macro base stations 121, and/or small cells 123 described herein may be a transmitting device 102 and/or a receiving device 104. For example, an RP 107, UE 111, macro base station 121, or small cell 123 may estimate noise power in wireless signals (received on a frequency channel) using a subset of the orthogonal spreading codes for the frequency channel that are not otherwise being used by other RPs 107, UEs 111, macro base stations 121, or small cells 123 in the same geographical area. Specifically, the receiving RP 107, UE 111, macro base station 121, or small cell 123 may despread the unused spreading codes as if they were utilized by normal users. In other words, the receiving RP 107, UE 111, macro base station 121, or small cell 123 may estimate noise power by despreading received power on a frequency channel based on an unused spreading code. This yields a projection of only the input noise component onto the unused dimensions/codes, which may be used to directly calculate the noise power and compensate for the spreading factor, as described below.

Example 5G C-RAN

Figure 3:
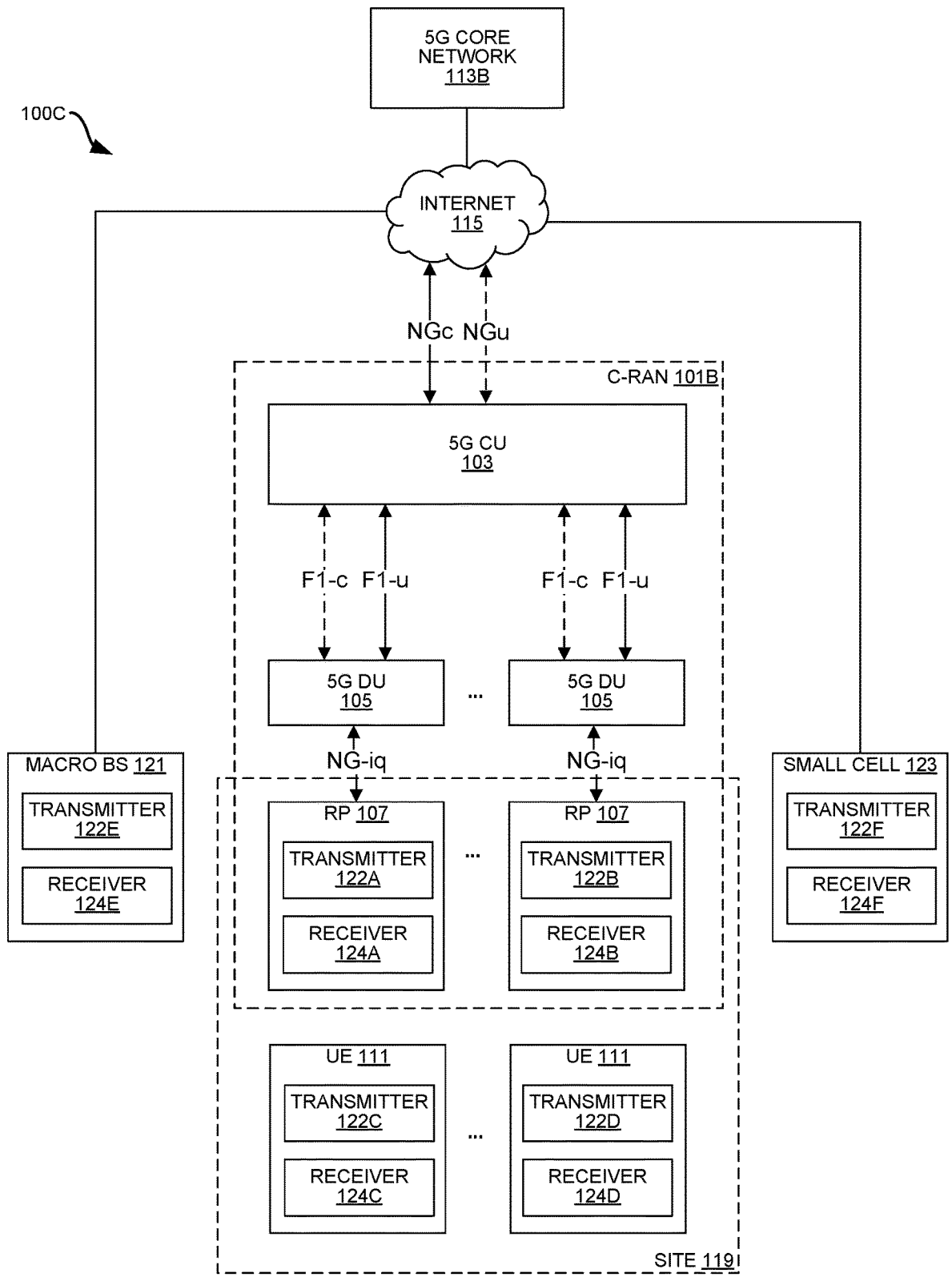
FIG. 3 is a block diagram illustrating another example communication system for estimating noise power on a frequency channel based on at least one unused orthogonal spreading code.

FIG. 3 is a block diagram illustrating another example communication system 100C for estimating noise power on a frequency channel based on at least one unused orthogonal spreading code. The communication system 100C includes 3GPP Fifth Generation (5G) components. Optionally, the communication system 100C may additionally include 4G components. Each of the components may be implemented using at least one processor executing instructions stored in at least one memory. In some configurations, at least some of the components are implemented using a virtual machine.

Fifth Generation (5G) standards support a wide variety of applications, bandwidth, and latencies while supporting various implementation options. In the system 100A, interfaces denoted with "-C" (illustrated with dashed lines) provide control plane connectivity, while interfaces denoted with ("-U") (illustrated with solid lines) provide user plane connectivity. More explanation of the various devices and interfaces in FIG. 3 can be found in 3GPP TR 38.801 Radio Access Architecture and Interfaces, Release 14 (available at https://portal.3gpp.org/desktopmodules/Specifications/ SpecificationDetails.aspx?specific ationId=3056), which is incorporated by reference herein. FIG. 3 illustrates a C-RAN 101B implementing an example of a 5G Next Generation NodeB (gNB).

The architecture of a Next Generation NodeB (gNB) is partitioned into a 5G Central Unit (CU) 103, one or more 5G Distributed Unit (DU) 105 and one or more 5G radio points (RP) 107. In some configurations, one or more RPs 107 may utilize a transmitter 122A-B and/or a receiver 124A-B according to the present systems and methods to transmit downlink signals to and receive uplink signals from nearby UEs 111, e.g., using the 3GPP 5G air interface.

A 5G Central Unit (CU) 103 is a node that includes the gNB controller functions such as the transfer of user data, mobility control, radio access network sharing, positioning, session management, etc. The 5G CU 103 controls the operation of the Distributed Units (DUs) 105 over an interface (including F1-c and F1-u for the control plane and user plane, respectively).

The Distributed Units (DUs) 105 may be nodes that implement a subset of the gNB functions, depending on the functional split (between CU 103 and DU 105). In some configurations, the L3 functionality may be implemented in the CU 103 and the L2 operations may be implemented in the DU 105. The operation of each DU 105 is controlled by a CU 103. The functions of the DU 105 may include Radio Link Control (RLC), portions of Medium Access Control (MAC) and/or portions of the physical (PHY) layer functions. A Distributed Unit (DU) can further offload some of its PHY functions to RPs 107.

In FIG. 3, the C-RAN 101B implementing the example Next Generation NodeB (gNB) includes a single CU 103, which handles control plane functions and user plane functions. The 5G CU 103 (in the C-RAN 101C) may communicate with at least one wireless service provider's Next Generation Cores (NGC) 113B using 5G NGc and 5G NGu interfaces, e.g., via the Internet 115.

In some 5G configurations, the RPs 107 may communicate baseband signal data to the DUs 105 on an NG-iq interface. In some 5G configurations, the RPs 107 may implement at least some of the Layer-1 and/or Layer-2 functions. In some configurations, the RPs 107 may have multiple ETHERNET ports and can communicate with multiple switches.

Any of the interfaces in FIG. 3 may be implemented using a switched ETHERNET (or fiber) network. One or more fronthaul networks (not shown) may facilitate any of the NG-iq, F1-c, and/or F1-u interfaces in FIG. 3. In some configurations, the baseband controller 118 (in the C-RAN 101A of FIG. 2) communicates with the 5G CU 103 (in the C-RAN 101B of FIG. 3).

Additionally, one or more macro base stations 121 and/or small cells 123 may also implement a transmitter 122E-F and/or a receiver 124E-F according to the present systems and methods.

Estimating Noise Based on Unused Spreading Codes

Figure 4:
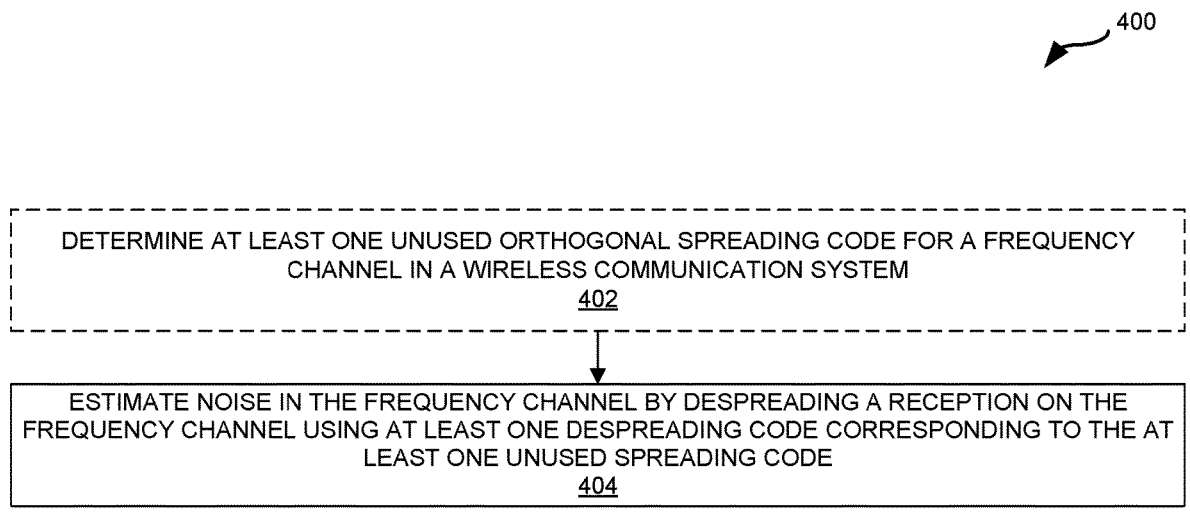
FIG. 4 is a flow diagram illustrating a method for estimating noise power on a frequency channel based on at least one unused orthogonal spreading code.

FIG. 4 is a flow diagram illustrating a method 400 for estimating noise power on a frequency channel based on at least one unused orthogonal spreading code. Optionally, the frequency channel may be the PUCCH in an LTE system. However, the method 400 may be used on any frequency channel with at least one unused spreading code.

The method 400 may be performed by at least a receiving device 104 in a communication system 100. In order to communicate with the receiving device 104, the transmitting device 102 may use a spreading code to increase the bandwidth of wirelessly-transmitted signals. This spreading enables multiple transmitting devices' 102 signals to be multiplexed onto the same time and frequency resources in the frequency channel. The receiving device 104 may use a despreading code (that corresponds to the spreading code used by a particular transmitting device 102) to despread signals received on the frequency channel and identify the particular transmitting device's 102 signal from the frequency channel.

However, in order to estimate noise power on the frequency channel, the method 400 begins at optional step 402 where the receiving device 104 determines at least one unused spreading code for the frequency channel. The communication system 100 may support N different orthogonal spreading codes on the frequency channel, only a subset of which (N-K) are used by transmitting devices 102 on the frequency channel. Therefore, the remaining K unused spreading code(s) may be used to make noise observation(s). The receiving device 104 may maintain a list, table, or other data structure indicating all the unused spreading codes available for noise power estimation.

The method proceeds at step 404 where the receiving device 104 estimates noise power in the frequency channel by despreading a (wireless) reception on the frequency channel (that is also demodulated), using at least one despreading code, where the at least one despreading code corresponds to the at least one unused spreading code. The reception may include (1) desired signal components present on the frequency channel, e.g., that are orthogonal to the at least one despreading code; and (2) noise (and/or interference) that is uniformly distributed in power across the N spreading codes (e.g., forming a basis for the reception).

In some examples, the receiving device 104 may iteratively despread receptions on the frequency channel, each iteration using a different despreading code corresponding to a respective orthogonal spreading code. For example, each despreading code 116 may be the complex-conjugate of a corresponding spreading code 108.

If there are N total (used and unused) spreading codes for the frequency channel, the noise power estimate for an individual unused spreading code may represent 1/N of the total noise power experienced by the receiving device 104 on the frequency channel. As an example, if the total noise power estimated across one unused of 48 total spreading codes for a frequency channel is X dB, the total noise power experienced by the receiving device 104 input on the frequency channel may be $X+10*\log_{10}(48)$ dB. Furthermore, if the total noise power estimated across 12 unused of the 48 total spreading codes is X dB, the total noise power experienced by each receiving device 104 on the frequency channel may be $X+10*\log_{10}(4)$ dB.

Figure 5:
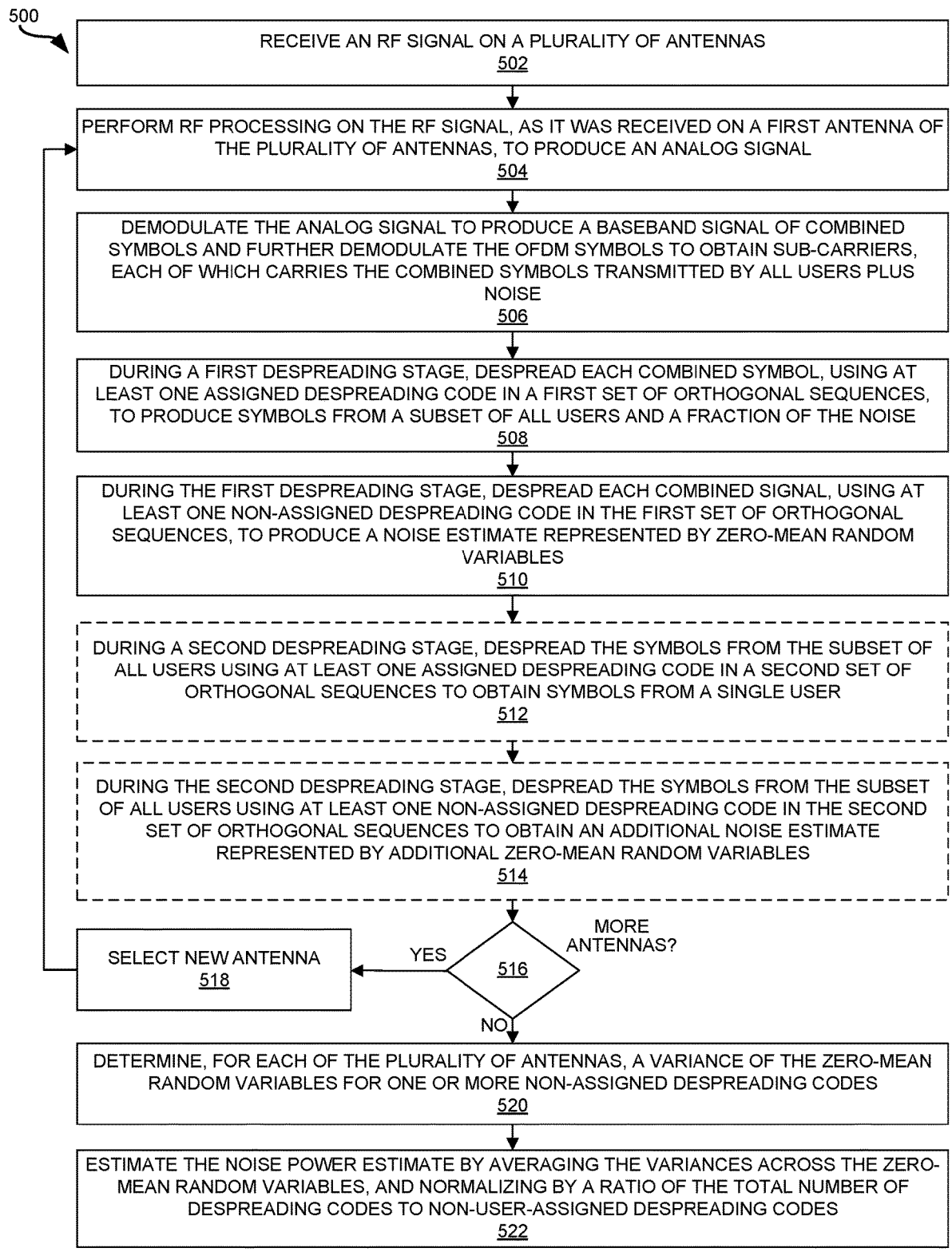
FIG. 5 is a flow diagram illustrating another method for estimating noise power on a frequency channel based on at least one unused orthogonal spreading code.

FIG. 5 is a flow diagram illustrating another method 500 for estimating noise power on a frequency channel based on at least one unused orthogonal spreading code. Optionally, the frequency channel may be the PUCCH in an LTE (or 5G) system. However, the method 500 may be used on any frequency channel with at least one unused spreading code. The method 500 may be performed, at least partially, by at least one processor in a receiving device 104. In some configurations, the method 500 of FIG. 5 may be an example implementation of step 404 in the method 400 of FIG. 4.

The blocks of the flow diagram shown in FIG. 5 have been arranged in a generally sequential manner for ease of explanation; however, it is to be understood that this arrangement is merely exemplary, and it should be recognized that the processing associated with method 500 (and the blocks shown in FIG. 5) can occur in a different order (for example, where at least some of the processing associated with the blocks is performed in parallel and/or in an event-driven manner). Also, most standard exception handling is not described for ease of explanation; however, it is to be understood that method 500 can and typically would include such exception handling.

The method 500 begins at step 502 where the at least one processor receives an RF signal on a plurality of antennas 132. The RF signal may be transmitted from a transmitting device 104, e.g., that used a spreading code to increase the bandwidth of wirelessly-transmitted signals.

The method 500 proceeds at step 504 where the at least one processor performs RF processing on the RF signal, as it was received by a first antenna of the plurality of antennas, to produce an analog signal (symbols). For example, an RF module 112B may filter, amplify, and/or down-convert the RF signal received from the transmitting device 102, e.g., using a band-pass filter, low-noise amplifier, and/or down-converter, respectively.

The method 500 proceeds at step 506 where the at least one processor demodulates the analog signal to produce a baseband signal of combined symbols, and further demodulates the OFDM symbols to obtain sub-carriers, each carrying the combined symbols transmitted by all users (e.g., nearby transmitting devices 102) plus noise.

In examples, each transmitting device 102 maps its modulated information symbols onto subcarriers in the frequency-domain, and then converts them to the time-domain using IFFT. This time-domain signal is called the baseband OFDM symbols, which is then RF modulated. The receiving device 104 demodulates the combined RF signal of all transmitters into a baseband signal and then at each OFDM symbol period converts it back to the frequency-domain using FFT, yielding the subcarriers which now contain the combined information symbols of all users.

Depending on the configuration, a receiving device 104 may use either one or two despreading stages. For example, in a single-stage spreading system configurations, the second despreading stage described below may not be performed at all. Each despreading stage uses both assigned and non-assigned sequences. For example, to demodulate a particular user, a user-specific combination of assigned sequences may be used in both despreading stages.

To obtain a noise estimate, a non-assigned combination of sequences is used (e.g., one of (1) assigned/non-assigned; (2) non-assigned/assigned; or (3) non-assigned/non-assigned in the first/second despreaders within a despreading stage). Accordingly, the specific use of assigned/non-assigned despreading codes in steps 508/510 of the first despreading stage below is merely exemplary, and could instead be non-assigned/assigned or non-assigned/non-assigned. Furthermore, step 510 might be performed before step 508 in some configurations.

Similarly, the specific use of assigned/non-assigned despreading codes in steps 512/514 of the second despreading stage below is merely exemplary, and could instead be non-assigned/assigned or non-assigned/non-assigned. Step 514 may be performed before step 512 in some configurations.

As used herein, an orthogonal sequence is "assigned" if it corresponds to a spreading code that is currently assigned to one or more (e.g., a subset of all) users. In contrast, a "non-assigned" orthogonal sequence corresponds to a spreading code that is not currently assigned to any users.

As used herein, a "despreader" refers a hardware and/or code executable to perform any of the despreading functionality described herein. For example, the first despreading stage described below may utilize a first despreader (in step 508) and a second despreader (in step 510). Similarly, the optional second despreading stage described below may utilize a first despreader (in step 512) and a second despreader (in step 514).

The method 500 proceeds at step 508 where, during a first despreading stage, the at least one processor despreads each combined symbol, using at least one assigned despreading code in a first set of orthogonal sequences, to produce symbols from a subset of all users (from step 506) and a fraction of the noise (from step 506). For example, despreading a particular combined symbol in step 508 may include multiplying the combined symbol with a different assigned orthogonal sequence. The symbols resulting from step 508 combine symbols transmitted by a smaller subset of users with a fraction of the total noise.

The method 500 proceeds at step 510 where, during the first despreading stage, the at least one processor also despreads each combined symbol, using at least one non-assigned despreading code in the first set of orthogonal sequences, to produce a noise estimate represented by a set of additional zero-mean (and i.i.d.) random variables. If performed, step 510 may improve the noise estimation error by providing more noise measurements.

When the first despreading stage utilizes non-assigned despreading codes (e.g., as in step 508), these non-assigned despreading codes can be utilized for noise estimation (e.g., as in step 510), in which case the second despreading stage (below) is optional. Because the non-assigned despreading codes (used in step 510) are not assigned to a user, the symbol(s) resulting from step 510 only contain an even smaller fraction of the noise (than the symbol(s) resulting in step 508).

However, if only the second despreading stage utilizes non-assigned despreading codes (i.e., the first despreading stage does not utilize non-assigned despreading codes), the non-assigned despreading codes must be despread (in the second despreading stage) for noise estimation. In other words, the second despreading stage must be performed in that scenario. If the system utilizes a two-stage despreading, both stages are necessary to demodulate user data.

The method 500 proceeds at step 512 where, during the optional second despreading stage, the at least one processor further despreads the symbols from the subset of all users (resulting from step 508 in the first despreading stage) using at least one assigned despreading code in a second set of orthogonal sequences to obtain symbols from a single user.

The method 500 proceeds at step 514 where, during the optional second despreading stage, the at least one processor further despreads the symbols from the subset of all users (resulting from step 508 in the first despreading stage) using at least one non-assigned despreading code in the second set of orthogonal sequences to obtain an additional noise estimate represented by a set of additional zero-mean random variables. The resulting symbols now contain an estimate of the signal sent by a single user+an even smaller fraction of the noise. Therefore, the noise estimated in optional step 514 is less than the noise estimate in step 510, which is less than the noise present in step 506.

It should also be noted that, when the second set of orthogonal sequences (used in step 514) are non-assigned, the resulting symbol(s) only contain an even smaller fraction of the noise (than the symbol(s) resulting in step 508).

It should also be noted that the noise components in the output of each despreading stage (e.g., step 510 and/or step 514) is a set of random variables ($\lambda_i$) that are independent and identically distributed (i.i.d.) with a zero-mean, and their power is equal to the input noise power divided by N, where N is the length of the spreading (orthogonal) sequence(s) used for despreading. This is because these sequences are designed as an orthonormal basis spanning a space of dimension N.

The method 500 proceeds at step 516 where the at least one processor determines if there are more antennas that received the RF signal, but have not yet been processed. If there are more antennas that need to be processed, the at least one processor selects a new antenna in step 518 and repeats steps 504-514). For example, if the RF signal is received on four antennas (in step 502), steps 504-514 may be performed for each of the four antennas.

If there are no more antennas that need to be processed, the method proceeds at step 520 where the at least one processor determines, for each of the plurality of antennas, a variance of the zero-mean random variables for one or more non-assigned despreading codes. In case of a single-stage spreading system, these zero-mean random variables may be noise samples output from step 510 (and the one or more non-assigned despreading codes are the at least one non-assigned despreading code in the first set of orthogonal sequences used in step 510)

In case of a dual-stage spreading system (e.g. PUCCH), these zero-mean random variables may include noise samples output from step 510 and step 514 where the variances determined for the noise from each step are weighted. In the dual-stage spreading system, the one or more non-assigned despreading codes used in step 520 are the at least one non-assigned despreading code in the first set of orthogonal sequences (used in step 510) and the at least one set of orthogonal sequences in the second set of orthogonal sequences (used in step 514).

The method 500 proceeds at step 522 where the at least one processor estimates the noise power by averaging the variances across the zero-mean random variables, and normalizing by a ratio of the total number of despreading codes (assigned+non-assigned) to non-assigned despreading codes.

PUCCH Example

A specific example on the PUCCH is now described. In PUCCH format 1, a single BPSK, or QPSK symbol (d), carrying acknowledgement bits for each user are spread over 2 slots, each consisting of $N_{seq}=12$ subcarriers by 7 symbols in the frequency domain. Of the 7 symbols, 4 carry the information, while the other 3 symbols are known reference symbols.

At each user/transmitting device 102, the complex-valued symbol d is multiplied by a cyclically-shifted sequence of length $N_{seq}$ to construct each symbol (m), where the cyclic shift is user specific:

$$y_m(n) = d \cdot r_u^{(\alpha_m)}(n); \text{ where } n=0,1,\ldots,N_{seq}-1$$

where $y_m(n)$ represents each user's information after a first stage of spreading using cyclically-shifted Zadoff-Chu code;

$$r_u^{(\alpha_m)}(n) = e^{j2\pi \cdot n \cdot \frac{n_{cs}(m)}{N_{seq}}} \cdot r_u(n)$$

is the cyclically-shifted Zadoff-Chu sequence ($r_u$) where all cyclic shifts ($n_{cs}$) yield orthogonal sequences; $j=\sqrt{-1}$; m is the symbol index; and n is the subcarrier index.

$y_m(n)$ is further spread using an orthogonal Walsh code over $N_{SF}=4$ data carrying symbols in the slot:

$$z_{m,n} = z(mN_{seq}+n) = s \cdot w_{noc}(m) \cdot y_m(n); \text{ where } m=0,1,\ldots,N_{SF}-1$$

where $z_{m,n}$ represents each user's information after a second stage of spreading using Walsh codes; s is a unit-energy constant scrambling factor for the user in the slot; and n is an index.

Note that only the 3 of the 4 orthogonal Walsh basis sequences are defined in Table 5.4.1-2 (from 3GPP TS 36.211 v15.4.0) for use as $w_{noc}(m)$. To illustrate, the bottom row is appended in the modified Table 5.4.1-2 below to show the $4^{th}$ unused sequence referred to by the invention:

TABLE 5.4.1-2

| Sequence index $n_{oc}^{(p)}(n_s)$ | Orthogonal sequences $[w(0) \ldots w(N_{SF}^{PUCCH}-1)]$ for $N_{SF}^{PUCCH}=4$ |
|---|---|
| 0 | [+1 +1 +1 +1] |
| 1 | [+1 −1 +1 −1] |
| 2 | [+1 −1 −1 +1] |
| 3 | [+1 +1 −1 −1] |

At the receiving device 104, the symbols contain a superposition of all active users/transmitting devices 102 with the addition of noise:

$$x_{m,n} = \sum_{i \text{ users}} h_{m,n}^{(i)} \cdot z_{m,n}^{(i)} + \varepsilon_{m,n}$$

where i is the user index; $x_{m,n}$ represents the receiving device's 104 input signal combining all user's contributions+noise; and $h_{m,n}^{(i)}$ is the complex-valued channel gain experienced by the user (i) transmission whose time-domain and frequency-domain dimensions are typically much smaller than the channel coherence time, and coherence bandwidth, respectively, and thus may be assumed to be constant over the resource elements (REs) of the slot. That is $h_{m,n}^{(i)} = h^{(i)}$. Furthermore, $\varepsilon_{m,n}$ is the noise component for each resource element, and the objective of noise power estimation is to assess its variance. In examples, $x_{m,n}$ represents the combined symbols transmitted by all users plus noise at the output of step 506 above.

The receiving device 104 must de-spread the users' symbols by multiplying the input signal with the complex-conjugate of the orthogonal code sequence utilized by each user/transmitting device 102. In case no users are active, only the noise components are received, i.e. $x_{m,n}=\varepsilon_{m,n}$.

The sequence ($e^*_i(k)$) is the set of combined orthogonal sequences used in the first and second despreading stages (e.g., steps 508-514), and it may be viewed as a basis of a linear ortho-normal transformation. Furthermore, $\varepsilon_k$ refers to a set of noise components (e.g., within outputs of step 506). By expanding the random sequence $\varepsilon_k = \varepsilon(mN_{seq}+n)$ using the following basis:

$$e_i^*(k) = \frac{s}{N_{SF} \cdot N_{seq}} \cdot w_{noc}\left(\left\lfloor \frac{k}{N_{seq}} \right\rfloor\right) \cdot r_u^{(\alpha_m)}(k \bmod N_{seq}),$$

we obtain a new set of random variables ($\lambda_i$) that are still zero mean, and all with the same variance:

$$\lambda_i = \sum_{k=0}^{N_{SF} \cdot N_{seq}-1} e_i(k) \cdot \varepsilon_k$$

where $N_{SF}$ is the number of scheduled subframes (e.g., for PUCCH transmission); k is a frequency-domain index; $e_i(k)$ is the complex conjugate of $e^*_i(k)$; and $w_{noc}(k)$ is the orthogonal code of the second despreading stage (its index changes only after k completes $N_{seq}$ increments). As such, the noise variance is equally divided amongst the $\lambda_i$ values, $$\text{i.e. } \text{var}\{\lambda_i\} = \frac{1}{N_{SF} \cdot N_{seq}} \cdot \text{var}\{\varepsilon_k\}.$$

For active users (i), the same expansion will yield:

$$\rho_i = \sum_{k=0}^{N_{SF} \cdot N_{seq}-1} e_i(k) \cdot x_k = d^{(i)} \cdot h^{(i)} + \lambda_i$$

And the data symbol of user i may be estimated $$\left(\text{e.g., by } \hat{d}^{(i)} = \frac{\hat{h}^{(i)*}}{|\hat{h}^{(i)}|^2} \cdot \rho_i\right)$$

where $h^{(i)}$ is the channel between user i and the current receive antenna; $\hat{h}^{(i)}$ the user i's channel estimate; $\rho_i$ is the user i's decision metric after despreading; and $x_k$ is the demodulated subcarriers of all used OFDM symbols. In examples, the channel estimate for user i ($\hat{h}^{(i)}$) is obtained using the 3 remaining reference symbols in the slot. But for inactive/non-existent users (i), $$\rho_i = \sum_{k=0}^{N_{SF} \cdot N_{seq}-1} e_i(k) \cdot x_k = \lambda_i$$

In particular, we can be certain that users utilizing $w_{noc=3}(m)$ do not exist. There are $N_{seq}$ such codes and this invention uses them to estimate the noise variance as follows:

$$\text{var}\{\hat{\varepsilon}_k\} = \frac{N_{SF} \cdot N_{seq}}{N_{seq} - 1} \sum_{i=(N_{SF}-1) \cdot N_{seq}}^{N_{SF} \cdot N_{seq} - 1} |\lambda_i|^2$$

Since there are typically several receive antennas at the receiving device 104, the same estimate is calculated for each antenna (e.g., step 518), and the results are averaged (e.g., step 520).

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. For example, where a computing device is described as performing an action, the computing device may carry out this action using at least one processor executing instructions stored on at least one memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Terminology

Brief definitions of terms, abbreviations, and phrases used throughout this application are given below.

The term "determining" and its variants may include calculating, extracting, generating, computing, processing, deriving, modeling, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms may refer to direct or indirect connections. If the specification states a component or feature "may," "can," "could," or "might" be included or have a characteristic, that particular component or feature is not required to be included or have the characteristic.

The terms "responsive" or "in response to" may indicate that an action is performed completely or partially in response to another action. The term "module" refers to a functional component implemented in software, hardware, or firmware (or any combination thereof) component.

The methods disclosed herein comprise one or more steps or actions for achieving the described method. Unless a specific order of steps or actions is required for proper operation of the method that is being described, the order and/or use of specific steps and/or actions may be modified without departing from the scope of the claims.

In conclusion, the present disclosure provides novel systems, methods, and arrangements for estimating noise power on a frequency channel based on at least one unused orthogonal spreading code. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a receiving device in a communication system, comprising: at least one processor configured to estimate noise power on a frequency channel by despreading a reception on the frequency channel using at least one non-assigned despreading code, wherein the at least one non-assigned despreading code corresponds to at least one spreading code that is unused by transmitting devices in the communication system on the frequency channel.

Example 2 includes the receiving device of Example 1, wherein the frequency channel is a physical uplink control channel (PUCCH).

Example 3 includes the receiving device of any of Examples 1-2, wherein the communication system implements a Long Term Evolution (LTE) air interface.

Example 4 includes the receiving device of any of Examples 1-3, wherein the communication system implements a Third Generation Partnership Project (3GPP) Fifth Generation (5G) air interface.

Example 5 includes the receiving device of any of Examples 1-4, wherein the at least one spreading code are among N spreading codes for the frequency channel, wherein the N spreading codes are orthogonal to each other.

Example 6 includes the receiving device of Example 5, wherein noise and interference power estimated using an individual non-assigned despreading code represents 1/N of the total noise and interference power experienced by the receiving device on the frequency channel.

Example 7 includes the receiving device of any of Examples 5-6, wherein the reception comprises: desired signal components present on the frequency channel and orthogonal to the at least one non-assigned despreading code; and noise and interference that is uniformly distributed in power across the N spreading codes forming a basis for the reception.

Example 8 includes the receiving device of any of Examples 1-7, wherein the at least one processor is configured to despread the reception by: during a first despreading stage: despreading each combined symbol in a baseband signal, using at least one assigned despreading code, to produce symbols from a subset of all users and a fraction of the noise; and despreading each combined symbol using the at least one non-assigned despreading code, to produce to produce a noise estimate represented by a set of additional zero-mean random variables.

Example 9 includes the receiving device of Example 8, wherein the at least one processor is further configured to despread the reception by: during a second despreading stage: despreading the symbols from the subset of all users using at least one assigned despreading code in a second set of orthogonal sequences to obtain user symbols; and despreading the symbols from the subset of all users using at least one non-assigned despreading code in the second set of orthogonal sequences to obtain an additional noise estimate represented by a set of additional zero-mean random variables.

Example 10 includes the receiving device of Example 9, wherein the at least one processor is configured to estimate the noise power by: determining a variance, for each of a plurality of antennas, a variance of the zero-mean random variables for the non-assigned despreading codes; and estimate the noise power by averaging the variances across the zero-mean random variables, and normalizing by a ratio of the total number of despreading codes to non-assigned despreading codes.

Example 11 includes a method for estimating noise power on a frequency channel in a communication system, the method being performed by a receiving device, the method comprising: estimating noise power on a frequency channel by despreading a reception on the frequency channel using at least one non-assigned despreading code, wherein the at least one non-assigned despreading code corresponds to at least one spreading code that is unused by transmitting devices in the communication system on the frequency channel.

Example 12 includes the method of Example 11, wherein the frequency channel is a physical uplink control channel (PUCCH).

Example 13 includes the method of any of Examples 11-12, wherein the communication system implements a Long Term Evolution (LTE) air interface.

Example 14 includes the method of any of Examples 11-13, wherein the communication system implements a Third Generation Partnership Project (3GPP) Fifth Generation (5G) air interface.

Example 15 includes the method of any of Examples 11-14, wherein the at least one spreading code are among N spreading codes for the frequency channel, wherein the N spreading codes are orthogonal to each other.

Example 16 includes the method of Example 15, wherein noise and interference power estimated using an individual non-assigned despreading code represents 1/N of the total noise and interference power experienced by the receiving device on the frequency channel.

Example 17 includes the method of any of Examples 15-16, wherein the reception comprises: desired signal components present on the frequency channel and orthogonal to the at least one non-assigned despreading code; and noise and interference that is uniformly distributed in power across the N spreading codes forming a basis for the reception.

Example 18 includes the method of any of Examples 11-17, wherein the at least one processor is configured to despread the reception by: during a first despreading stage: despreading each combined symbol in a baseband signal, using at least one assigned despreading code, to produce symbols from a subset of all users and a fraction of the noise; and despreading each combined symbol using the at least one non-assigned despreading code, to produce to produce a noise estimate represented by a set of additional zero-mean random variables.

Example 19 includes the method of Example 18, wherein the at least one processor is further configured to despread the reception by: during a second despreading stage: despreading the symbols from the subset of all users using at least one assigned despreading code in a second set of orthogonal sequences to obtain user symbols; and despreading the symbols from the subset of all users using at least one non-assigned despreading code in the second set of orthogonal sequences to obtain an additional noise estimate represented by a set of additional zero-mean random variables.

Example 20 includes the method of Example 19, wherein the at least one processor is configured to estimate the noise power by: determining a variance, for each of a plurality of antennas, a variance of the zero-mean random variables for the non-assigned despreading codes; and estimate the noise power by averaging the variances across the zero-mean random variables, and normalizing by a ratio of the total number of despreading codes to non-assigned despreading codes.

The invention claimed is:

1. A receiving device in a communication system, comprising:
at least one processor configured to estimate noise power on a frequency channel by despreading a reception on the frequency channel using at least one non-assigned despreading code, wherein the at least one non-assigned despreading code is a complex-conjugate of at least one spreading code that is unused by transmitting devices in the communication system on the frequency channel, wherein the least one spreading code are among N spreading codes for the frequency channel, wherein the N spreading codes are orthogonal to each other; and
wherein noise and interference power estimated using an individual non-assigned dispreading code represents 1/N of a total noise and interference power experienced by the receiving device on the frequency channel.

2. The receiving device of claim 1, wherein the frequency channel is a physical uplink control channel (PUCCH).

3. The receiving device of claim 1, wherein the communication system implements a Long Term Evolution (LTE) air interface.

4. The receiving device of claim 1, wherein the communication system implements a Third Generation Partnership Project (3GPP) Fifth Generation (5G) air interface.

5. The receiving device of claim 1, wherein the reception comprises:
- desired signal components present on the frequency channel and orthogonal to the at least one non-assigned despreading code; and
- noise and interference that is uniformly distributed in power across the N spreading codes forming a basis for the reception.

6. The receiving device of claim 1, wherein the at least one processor is configured to despread the reception by:
- during a first despreading stage:
  - despreading each combined symbol in a baseband signal, using at least one assigned despreading code in a first set of orthogonal sequences, to produce symbols from a subset of all users and a fraction of the noise; and
  - despreading each combined symbol using the at least one non-assigned despreading code in the first set of orthogonal sequences, to produce to produce a noise estimate represented by a set of additional zero-mean random variables.

7. The receiving device of claim 6, wherein the at least one processor is further configured to despread the reception by:
- during a second despreading stage:
  - despreading the symbols from the subset of all the users using one or more assigned despreading code in a second set of orthogonal sequences to obtain user symbols; and
  - despreading the symbols from the subset of all the users using the at least one non-assigned despreading code in the second set of orthogonal sequences to obtain an additional noise estimate represented by an additional set of zero-mean random variables.

8. The receiving device of claim 7, wherein the at least one processor is configured to estimate the noise power by:
- determining a variance, for each of a plurality of antennas, a variance of the zero-mean random variables for the non-assigned despreading codes; and
- estimate the noise power by averaging the variances across the zero-mean random variables, and normalizing by a ratio of a total number of despreading codes to non-assigned despreading codes.

9. A method for estimating noise power on a frequency channel in a communication system, the method being performed by a receiving device, the method comprising:
- estimating the noise power on the frequency channel by despreading a reception on the frequency channel using at least one non-assigned despreading code, wherein the at least one non-assigned despreading code is a complex-conjugate of at least one spreading code that is unused by transmitting devices in the communication system on the frequency channel, wherein the at least one spreading code are among N spreading codes for the frequency channel, wherein the N spreading codes are orthogonal to each other; and
- wherein the noise and interference power estimated using an individual non-assigned dispreading code represents 1/N of a total noise and interference power experienced by the receiving device on the frequency channel.

10. The method of claim 9, wherein the frequency channel is a physical uplink control channel (PUCCH).

11. The method of claim 9, wherein the communication system implements a Long Term Evolution (LTE) air interface.

12. The method of claim 9, wherein the communication system implements a Third Generation Partnership Project (3GPP) Fifth Generation (5G) air interface.

13. The method of claim 9, wherein the reception comprises:
- desired signal components present on the frequency channel and orthogonal to the at least one non-assigned despreading code; and
- noise and interference that is uniformly distributed in power across the N spreading codes forming a basis for the reception.

14. The method of claim 9, further comprising despreading the reception by:
- during a first despreading stage:
  - despreading each combined symbol in a baseband signal, using at least one assigned despreading code in a first set of orthogonal sequences, to produce symbols from a subset of all users and a fraction of the noise; and
  - despreading each combined symbol using the at least one non-assigned despreading code in the first set of orthogonal sequences, to produce to produce a noise estimate represented by a set of additional zero-mean random variables.

15. The method of claim 14, further comprising despreading he reception by:
- during a second despreading stage:
  - despreading the symbols from the subset of all the users using one or more assigned despreading code in a second set of orthogonal sequences to obtain user symbols; and
  - despreading the symbols from the subset of all the users using the at least one non-assigned despreading code in the second set of orthogonal sequences to obtain an additional noise estimate represented by an additional set of zero-mean random variables.

16. The method of claim 15, further comprising estimating the noise power by:
- determining a variance, for each of a plurality of antennas, a variance of the zero-mean random variables for the non-assigned despreading codes; and
- estimate the noise power by averaging the variances across the zero-mean random variables, and normalizing by a ratio of a total number of despreading codes to non-assigned despreading codes.

* * * * *